(12) United States Patent
Hassan et al.

(10) Patent No.: US 10,349,444 B2
(45) Date of Patent: Jul. 9, 2019

(54) PRIORITY ACCESS TO A PRIORITY ACCESS CHANNEL

(71) Applicant: Microsoft Technology Licensing, LLC, Redmond, WA (US)

(72) Inventors: Amer A. Hassan, Kirkland, WA (US); Paul William Alexander Mitchell, Seattle, WA (US); Todd Haugen, Bellevue, WA (US); Paul W. Garnett, Albany, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/634,565

(22) Filed: Jun. 27, 2017

(65) Prior Publication Data

US 2017/0303308 A1  Oct. 19, 2017

Related U.S. Application Data

(63) Continuation of application No. 14/252,460, filed on Apr. 14, 2014, now Pat. No. 9,723,541.
(Continued)

(51) Int. Cl.
*H04W 74/00* (2009.01)
*H04W 48/02* (2009.01)
(Continued)

(52) U.S. Cl.
CPC ......... *H04W 74/004* (2013.01); *H04W 12/04* (2013.01); *H04W 12/06* (2013.01);
(Continued)

(58) Field of Classification Search
None
See application file for complete search history.

(56) References Cited

U.S. PATENT DOCUMENTS 8,126,473 B1   2/2012  Kim et al.
8,279,823 B2  10/2012  Stanforth
(Continued)

FOREIGN PATENT DOCUMENTS

CN  101213791 A  7/2008
CN  101359930 A  2/2009
(Continued)

OTHER PUBLICATIONS

"Office Action Issued in European Patent Application No. 15709789.0", dated May 25, 2015, 6 Pages.
(Continued)

*Primary Examiner* — Alex Skripnikov
(74) *Attorney, Agent, or Firm* — Schwegman Lundberg & Woessner, P.A.

(57) ABSTRACT

Techniques for priority access to a priority access channel are described. In at least some embodiments, a portion of the radio spectrum is divided into general access (GA) channels and priority access (PA) channels. Levels of access to the different channels are controlled based upon priority levels of devices attempting to access the channels. For instance, embodiments employ a channel database that tracks available GA channels and PA channels, and notifies various devices of the available channels. The channel database may also track keys for PA channels that enable authentication of devices for priority access to PA channels. In at least some embodiments, tracking available GA channels and PA channels enables underutilized radio channels to be identified for various uses, such as for wireless broadband communication.

18 Claims, 10 Drawing Sheets

Related U.S. Application Data

(60) Provisional application No. 61/944,447, filed on Feb. 25, 2014.

(51) Int. Cl.
    *H04W 12/04* (2009.01)
    *H04W 48/18* (2009.01)
    *H04W 12/06* (2009.01)
    *H04W 74/08* (2009.01)

(52) U.S. Cl.
    CPC ............ *H04W 48/02* (2013.01); *H04W 48/18* (2013.01); *H04W 74/08* (2013.01)

(56) References Cited

U.S. PATENT DOCUMENTS

| | | | |
|---|---|---|---|
| 8,483,155 | B1 | 7/2013 | Banerjea et al. |
| 8,504,087 | B2 | 8/2013 | Stanforth et al. |
| 9,092,533 | B1 | 7/2015 | Demathieu |
| 9,723,541 | B2 | 8/2017 | Hassan et al. |
| 2002/0071449 | A1 | 6/2002 | Ho et al. |
| 2007/0026868 | A1 | 2/2007 | Schulz et al. |
| 2007/0097891 | A1 | 5/2007 | Kitchin |
| 2007/0129079 | A1 | 6/2007 | Schwarz et al. |
| 2009/0137247 | A1 | 5/2009 | Mok |
| 2009/0279509 | A1 | 11/2009 | Reumerman et al. |
| 2010/0046483 | A1 | 2/2010 | Nandagopalan |
| 2010/0199341 | A1 | 8/2010 | Foti et al. |
| 2010/0317391 | A1 | 12/2010 | Mody et al. |
| 2011/0055070 | A1 | 3/2011 | Stanforth et al. |
| 2011/0138183 | A1 | 6/2011 | Reddy et al. |
| 2012/0294168 | A1* | 11/2012 | Freda .................. H04B 1/0067 370/252 |
| 2013/0185552 | A1 | 7/2013 | Steer |
| 2013/0311669 | A1* | 11/2013 | Reimers ................. H04H 20/42 709/231 |
| 2014/0126503 | A1 | 5/2014 | Kim et al. |
| 2014/0171072 | A1* | 6/2014 | Kang .................... H04W 16/14 455/434 |
| 2015/0245277 | A1 | 8/2015 | Hassan et al. |
| 2015/0304853 | A1* | 10/2015 | Murray ................. H04W 16/14 455/454 |

FOREIGN PATENT DOCUMENTS

| | | |
|---|---|---|
| CN | 102256261 A | 11/2011 |
| RU | 2248680 C2 | 3/2005 |
| WO | 2012150796 A2 | 11/2012 |
| WO | 2013172333 A1 | 11/2013 |
| WO | WO-2014062049 | 4/2014 |

OTHER PUBLICATIONS

"Office Action Issued in Australian Patent Application No. 2015223377", dated May 4, 2018, 3 Pages.

"Office Action Issued in Mexican Patent Application No. MX/a/2016/011046", dated Oct. 23, 2017, 3 Pages.

"Invitation to Pay Additional Fee Issued in PCT Application No. PCT/US2015/016730", dated Jun. 3, 2015, 7 Pages.

"Enabling Innovative Small Cell Use in 3.5 Ghz Band NPRM & Order", retrieved from http://www.fcc.gov/document/enabling-innovative-small-cell-use-35-ghz-band-nprm-order on Feb. 11, 2014, Jan. 2, 2013, 86 pages.

"Final Office Action", U.S. Appl. No. 14/252,460, dated Dec. 14, 2016, 12 pages.

"Foreign Office Action", RU Application No. 2016134455, dated Sep. 27, 2016, 3 pages.

"International Preliminary Report on Patentability", Application No. PCT/US2015/016730, dated Jun. 10, 2016, 13 pages.

"International Search Report and Written Opinion", Application No. PCT/US2015/016730, dated Jul. 23, 2015, 18 Pages.

"Non-Final Office Action", U.S. Appl. No. 14/252,460, dated Jun. 13, 2016, 15 pages.

"Notice of Allowance", U.S. Appl. No. 14/252,460, dated Mar. 27, 2017, 8 pages.

"Spectrum Bridge Response to IDA Consultation on TVWS Operations", retrieved from http://www.ida.gov.sg/~/media/Files/PCDG/Consultations/20130617_whitespace/SpectrumBridge.pdf on Feb. 11, 2014, Aug. 30, 2013, 15 pages.

Denkovski, "Policy Enforced Spectrum Sharing for Unaware Secondary Systems", In Proceedings of the 4th International Conference on Cognitive Radio and Advanced Spectrum Management; retrieved from http://dl.acm.org/citation.cfm?id=2093316 on Feb. 11, 2014, Oct. 26, 2011, 5 pages.

Liu, "Authenticating Primary Users' Signals in Cognitive Radio Networks via Integrated Cryptographic and Wireless Link Signatures", 2010 IEEE Symposium on Security and Privacy, May 16, 2010, 16 Pages.

Park, "Security and Enforcement in Spectrum Sharing", In Proceedings of IEEE, vol. 102, Issue 3; retrieved from http://www.arias.ece.vt.edu/publications/conferences/pub_2014_jnl_park.pdf on Feb. 11, 2014, Mar. 2014, 10 pages.

Parvin, "Digital Signature-based Authentication Framework in Cognitive Radio Networks", Advances in Mobile Computing & Multimedia, ACM, New York, NY, Dec. 3, 2012, 7 Pages.

Tan, "Cryptographic Link Signatures for Spectrum Usage Authentication in Cognitive Radio", Wireless Network Security, ACM, 2 Penn Plaza, Suite 701 New York Ny 10121-0701 USA, Jun. 14, 2011, 12 Pages.

"Office Action Issued in European Patent Application No. 15709789.0", dated Oct. 20, 2017, 13 Pages.

"Office Action Issued in Australian Patent Application No. 2015223377", dated Jul. 3, 2018, 3 Pages.

"Second Office Action Issued in Russian Application No. 2016134455", dated Oct. 11, 2018, 12 Pages.

"First Office Action Issued in Japanese Application No. 2016-553836", dated Nov. 6, 2018, 5 Pages.

"Office Action and Search Report Issued in Chinese Application No. 201580010473.2", (w/ Concise Statement of Relevance), dated Jan. 17, 2019, 14 Pages.

* cited by examiner

PRIORITY ACCESS TO A PRIORITY ACCESS CHANNEL

RELATED APPLICATION

This application is a divisional of and claims priority to U.S. patent application Ser. No. 14/252,460, filed on Apr. 14, 2014 and titled "Priority Access to a Priority Access Channel," which claims priority to U.S. Provisional Patent Application No. 61/944,447, filed on Feb. 25, 2014 and titled "Priority Access to a Priority Access Channel," the entire disclosures of which are incorporated in their entirety by reference herein.

BACKGROUND

Many devices today utilize some form of wireless radio frequency (RF) data communication. Examples of RF communication include cellular networks (e.g., for cell phones), data broadband (e.g., Wi-Fi®), broadcast television, global positioning system (GPS) navigation, and so forth. Typically, different forms of RF communication use different portions of the radio spectrum. While many portions of the radio spectrum are allocated and/or licensed for particular uses, there remain portions that are underutilized. Underutilized portions of the radio spectrum may be leveraged for various purposes, such as for unlicensed forms of RF communication. Any use of such underutilized portions, however, must avoid interference with existing licensed RF communications and must comply with regulatory requirements for RF communication.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for priority access to a priority access channel are described. In at least some embodiments, a portion of the radio spectrum is divided into general access (GA) channels and priority access (PA) channels. Levels of access to the different channels are controlled based upon priority levels of devices attempting to access the channels.

For instance, embodiments employ a channel database that tracks available GA channels and PA channels, and notifies various devices of the available channels. The channel database may also track keys for PA channels that enable authentication of devices for priority access to PA channels. In at least some embodiments, tracking available GA channels and PA channels enables underutilized radio channels to be identified for various uses, such as for wireless broadband communication.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
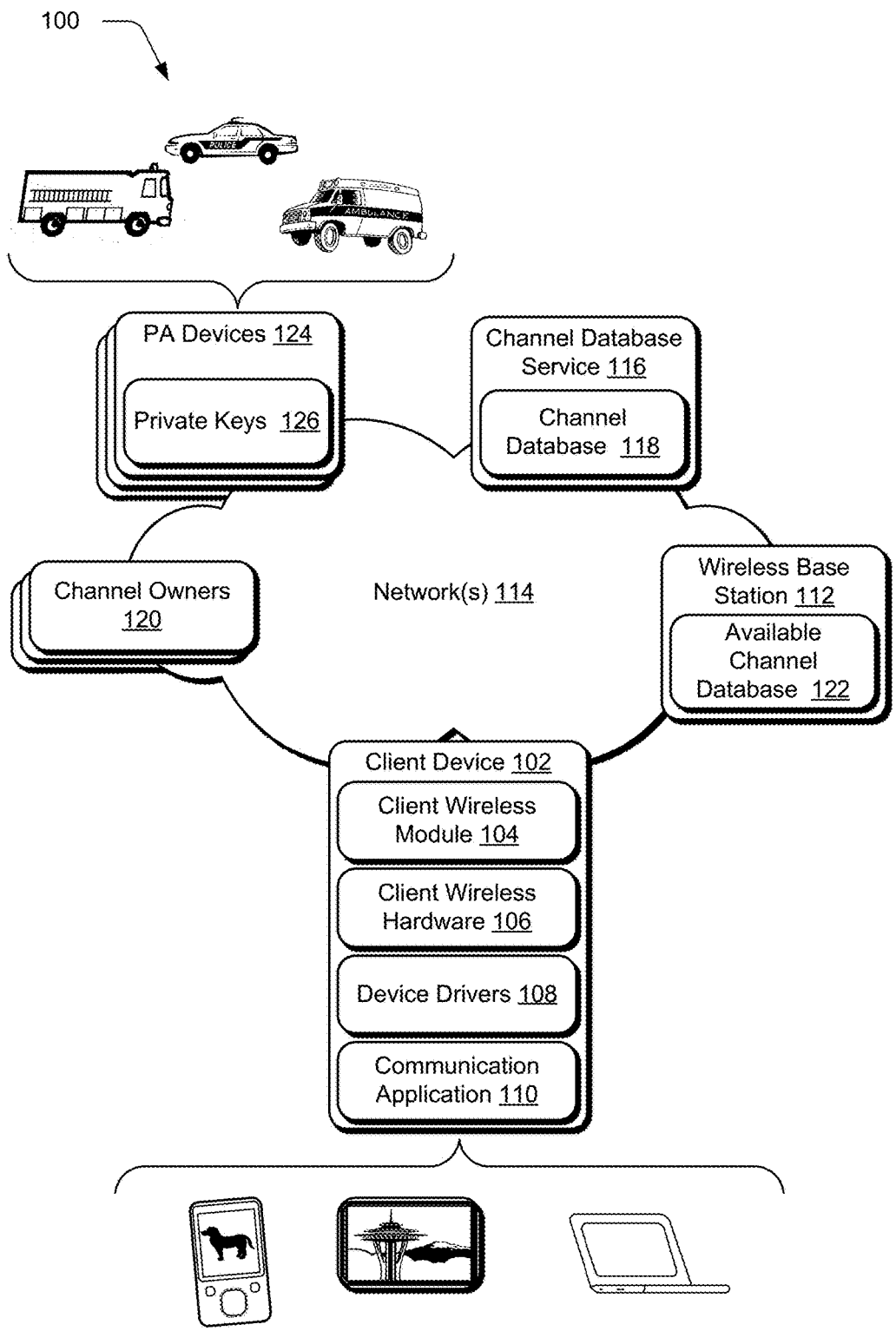
FIG. 1 is an illustration of an environment in an example implementation that is operable to employ techniques discussed herein in accordance with one or more embodiments.

Techniques for priority access to a priority access channel are described. In at least some embodiments, a portion of the radio spectrum (e.g., the 3.5 gigahertz band) is divided into general access (GA) channels and priority access (PA) channels. Levels of access to the different channels are controlled based upon priority levels of devices attempting to access the channels.

For instance, embodiments employ a channel database that tracks available GA channels and PA channels, and notifies various devices of the available channels. The channel database may also track keys for PA channels that enable authentication of devices for priority access to PA channels. In at least some embodiments, tracking available GA channels and PA channels enables underutilized radio channels to be identified for various uses, such as for wireless broadband communication.

For instance, consider a scenario where a channel database notifies a general access (GA) device of available GA channels and PA channels. Generally, a GA device represents a device (e.g., a mobile device) that is utilized by a typical user for general purposes. Further to this scenario, the GA device begins transmitting data over a particular PA channel. While transmitting over the PA channel, the GA device detects that a priority access (PA) device is accessing the PA channel.

Generally, a PA device represents a device (e.g., a mobile device) that is utilized by a priority user for priority purposes. Examples of PA devices include devices used for emergency purposes, such as by emergency medical personnel, firefighters, law enforcement officials, and so forth.

Continuing with the scenario, the GA device attempts to authenticate the PA device as being entitled to priority access to the PA channel. The GA device, for instance, determines whether a digital signature received from the PA device matches a digital signature for the PA channel. If the signatures match, the GA device determines that the PA device is entitled to priority access to the PA channel. The GA device may then release the PA channel, e.g., discontinue using the PA channel. Otherwise, if the signatures do not match, the GA device may determine that the PA device is not authenticated, and thus may continue using the PA channel.

In at least some embodiments, available GA channels and PA channels can be leveraged to transmit wireless broadband data, such as for data transmission as part of a wireless local area network (WLAN). The data transmission, for example, can be performed according to the 802.11 Standards for wireless data communication managed by the Institute of Electrical and Electronics Engineers (IEEE). The 802.11 Standards are often referred to as "Wi-Fi®", but are referenced herein in various ways.

In the following discussion, an example environment is first described that is operable to employ techniques described herein. Next, a section entitled "Example Implementation Scenarios" describes some implementation scenarios involving techniques discussed herein which may be employed in the example environment as well as in other environments. Following this, a section entitled "Example Procedures" describes some example procedures for priority access to a priority access channel in accordance with one or more embodiments. Finally, a section entitled "Example System and Device" describes an example system and device that are operable to employ techniques discussed herein in accordance with one or more embodiments.

Example Environment

FIG. 1 is an illustration of an environment 100 in an example implementation that is operable to employ techniques for priority access to a priority access channel. Environment 100 includes a client device 102 which can be embodied as any suitable device such as, by way of example and not limitation, a smartphone, a tablet computer, a portable computer (e.g., a laptop), a desktop computer, and so forth. One of a variety of different examples of a client device 102 is shown and described below in FIG. 10.

The client device 102 of FIG. 1 is illustrated as including a client wireless module 104, which is representative of functionality to enable the client device 102 to communicate wirelessly with other devices and/or entities. The client wireless module 104 can be configured to enable data communication via a variety of different wireless techniques and protocols. Examples of such techniques and/or protocols include cellular communications (e.g. 3G, 4G, Long Term Evolution (LTE), and so forth), near field communication (NFC), short-range wireless connections (e.g., Bluetooth), local area wireless networks (e.g., one or more standards in compliance with IEEE 802.11), wide area wireless networks (e.g., one or more standard in compliance with IEEE 802.16 or 802.22), wireless telephone networks, and so on. For instance, the client wireless module 104 is configured to perform various aspects of techniques for priority access to a priority access channel discussed herein.

The client device 102 further includes client wireless hardware 106, which is representative of various hardware components that can be employed to enable the client device 102 to communicate wirelessly. Examples of the client wireless hardware 106 include radio transmitters, radio receivers, various types and/or combinations of antennas, impedance matching functionality, and so on. In at least some embodiments, the client device 102 is a multi-radio device that can communicate via different wireless technologies and/or protocols.

Further included as part of the client device 102 are one or more device drivers 108, which are representative of functionality to enable the client device 102 to interact with various devices, and vice-versa. For instance, the device drivers 108 can enable interaction between various functionalities of the client device 102 (e.g., an operating system, applications, services, and so on) and different devices of the client device 102, such as input/output (I/O) devices. The device drivers 108, for instance, can enable interaction between the client wireless module 104 and the client wireless hardware 106 to enable the client device 102 to transmit and receive wireless signals.

In at least some embodiments, the client device 102 is configured to communicate with other devices and/or entities via a communication application 110. Generally, the communication application 110 is representative of functionality to enable different forms of communication via the client device 102. Examples of the communication application 110 include a voice communication application (e.g., a Voice over Internet Protocol (VoIP) client), a video communication application, a messaging application, a content sharing application, and combinations thereof. The communication application 110, for instance, enables different communication modalities to be combined to provide diverse communication scenarios.

The environment 100 further includes a wireless base station 112, which is representative of a radio receiver and transmitter that serves as a hub for at least some wireless portions of network(s) 114. In at least some embodiments, the wireless base station 112 may serve as a gateway between wired and wireless portions of the network(s) 114. The wireless base station 112 also includes functionality for performing various aspects of the techniques for priority access to a priority access channel discussed herein, which are discussed in detail below. According to one or more embodiments, the wireless base station 112 includes functionality for wireless communication via a variety of different wireless technologies and protocols, examples of which are discussed elsewhere herein.

Generally, the network 114 is representative of a single network or a combination of different interconnected networks. In at least some embodiments, the network 114 represents different portions of the radio spectrum that may be leveraged for wireless communication. The network 114, for instance, represents radio spectrum in different frequency bands, such as ultra-high frequency (UHF), super-high frequency (SHF), and so forth. The network 114 may also represent a combination of wireless and wired networks and may be configured in a variety of ways, such as a wide area network (WAN), a local area network (LAN), the Internet, and so forth.

The environment 100 further includes a channel database service 116, which is representative of functionality to track and/or manage various attributes of wireless channels. The channel database service 116, for instance, can track channel utilization for different wireless channels, e.g., whether a particular wireless channel is in use and/or is available to be used for wireless communication, level of channel usage for different channels, and so forth. The channel database service 116 may track and monitor various other attributes of wireless channel, such as channel quality, signal-to-noise ratios for different channels, noise floor in particular channels, and so forth. For example, the channel database service 116 maintains a channel database 118 that stores status information for different wireless channels. As further detailed below, the channel database service 116 may provide channel information from the channel database 118 to different entities (e.g., the wireless base station 112 and/or the client device 102) to enable wireless channels to be selected for wireless communication.

Further included are channel owners 120, which are representative of different entities that have certain rights and/or privileges to different portions of the radio spectrum. For instance, the channel owners 120 may represent licensees of certain portions of the radio spectrum in a particular market and/or markets, such as television networks, cellular carriers, radio stations, and so forth. The channel owners 120 may also represent entities that are granted exclusive or shared access to particular frequency bands, such as government organizations, emergency services, academic and/or research entities, and so forth. Generally, licenses and privileges for access to different portions of the radio spectrum are regulated by government organizations, such as the Federal Communications Commission (FCC) in the United States, the Office of Communications (OFCOM) in the United Kingdom, and so forth. In at least some embodiments, the channel owners 120 are considered "incumbents" for respective channels that are entitled to highest priority access to particular channels.

As further illustrated in the environment 100, the wireless base station 112 includes an available channel database 122, which is representative of a database of wireless channels that are available for wireless communication in the network 114. The available channel database 122, for instance, can be populated with channel information received from the channel database service 116. In at least some embodiments, available channel information from the available channel database 122 can be propagated to the client device 102 to enable a channel and/or channels to be selected for wireless communication. Further details concerning identification and selection of wireless channels are presented below.

The environment 100 further includes priority access (PA) devices 124, which are representative of devices that may be granted priority access to certain channels for wireless communication. The PA devices 124, for instance, may be devices that are utilized by mission critical personnel, such as emergency medical personnel, firefighters, law enforcement, and so forth. In at least some embodiments, for instance, the PA devices are not natively allocated channels in a particular region of the radio spectrum (e.g., are not channel owners 120), but may be entitled to priority access to such channels according to techniques discussed herein.

The PA devices 124 maintain and/or have access to private keys 126, which are utilized as part of various authentication procedures for authenticating the PA devices 124 for priority access to wireless channels. Further details concerning use of the private keys 126 are discussed below.

According to implementations discussed herein, techniques can be employed to establish wireless data communication between the client device 102 and other devices utilizing a variety of different wireless data communication techniques and/or protocols. For instance, channels that are identified in the available channel database 122 may be leveraged for wireless communication via various of the 802.11 standards. This is not intended to be limiting, however, and a wide variety of different wireless techniques and protocols may be utilized in accordance with the disclosed embodiments. Further, while certain aspects of established wireless protocols (e.g., 802.11, Wi-Fi Direct™, and so on) may be utilized in tandem with techniques discussed herein to enable wireless data communication between devices, techniques discussed herein are inventive and are not to be considered part of these protocols as they currently exist.

Having described an example environment in which the techniques described herein may operate, consider now a discussion of some example implementation scenarios in accordance with one or more embodiments.

Example Implementation Scenarios

The following discussion describes example implementation scenarios for priority access to a priority access channel in accordance with one or more embodiments. In portions of the following discussion, reference will be made to the environment 100 of FIG. 1.

Figure 2:
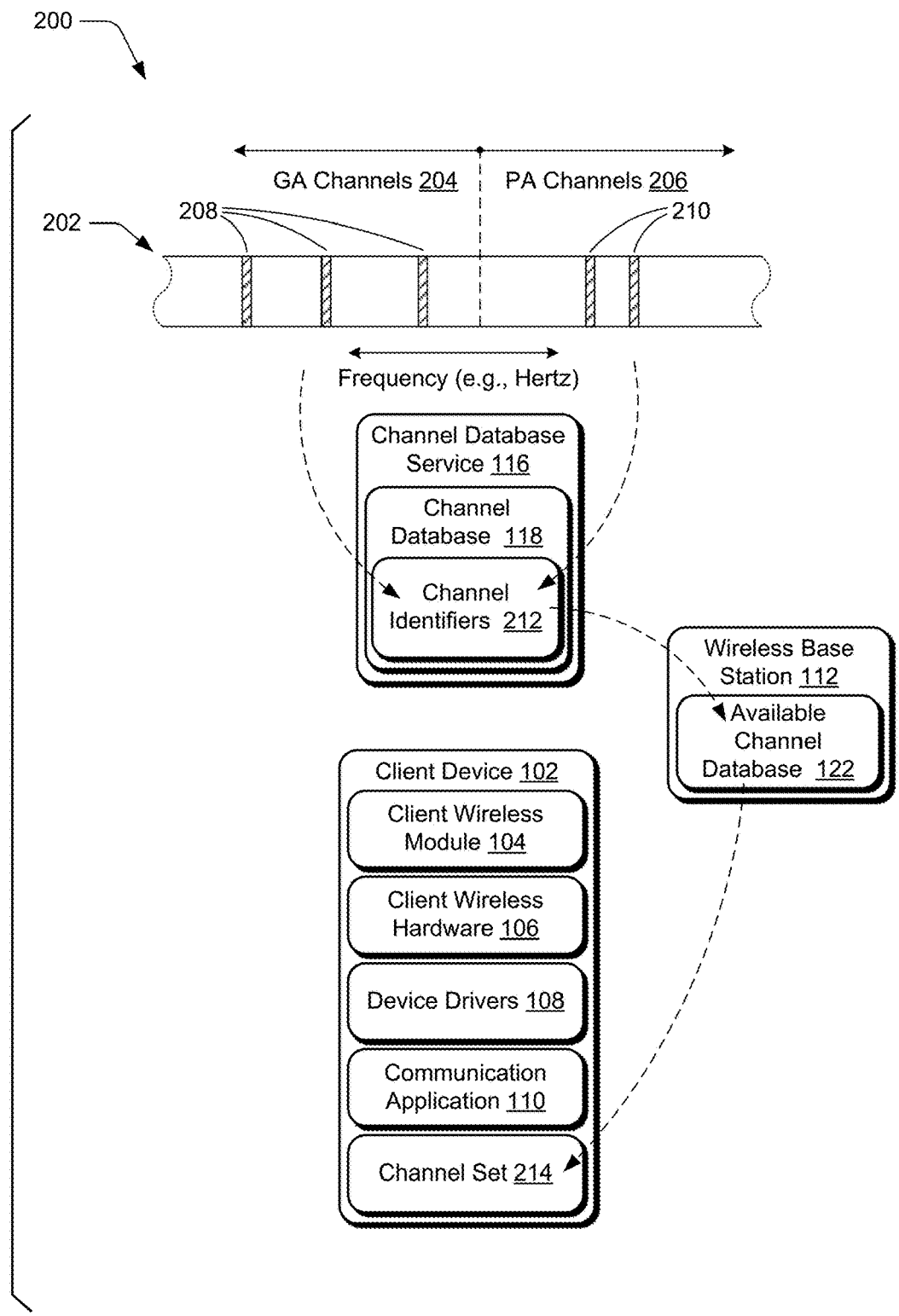
FIG. 2 illustrates an example implementation scenario for determining available wireless channels in accordance with one or more embodiments.

FIG. 2 illustrates an example implementation scenario 200 for determining available wireless channels in accordance with one or more embodiments.

The scenario 200 includes a spectrum portion 202 of the radio spectrum. Generally, the spectrum portion 202 represents a discrete band of radio frequencies. For instance, the spectrum portion 202 may represent frequencies in the 3.5 gigahertz (GHz) band, e.g., 3550-3650 megahertz. The 3.5 GHz band is presented for purpose of example only, and it is to be appreciated that the spectrum portion 202 may represent any suitable region of the radio spectrum.

Further to the scenario 200, the spectrum portion 202 is divided into general access (GA) channels 204 and priority access (PA) channels 206. According to various embodiments, the GA channels 204 can be used by general access devices (e.g., the client device 102) for wireless data transmission. While channels from the PA channels 206 may also be utilized by general access devices, such use is subject to certain conditions and constraints, examples of which are detailed below.

In the scenario 200, the channel database service 116 determines that the GA channels 204 include available general access (GA) channels 208, and the PA channels 206 include available priority access (PA) channels 210. Channel availability may be determined in a variety of ways. For instance, the channel database service 116 may scan the spectrum portion 202 for channels that are not being used for signal transmission by a channel owner 120. Since the channel owners 120 are typically considered highest priority users, a channel in use by a channel owner 120 will be considered unavailable. As another example, a channel owner 120 or other entity may notify the channel database service 116 that a channel is available.

As yet another example, the channel database service 116 may query the channel owners 120 as to whether their respective channels are being utilized. Channel availability may be determined in a variety of other ways not expressly discussed herein.

In at least some embodiments, the available GA channels 208 and the available PA channels 210 represent channels that are allocated for use by the channel owners 120, but that are not currently being used.

Further to the scenario 200, the channel database service 116 stores channel identifiers 212 for the available GA channels 208 and the available PA channels 210 as part of the channel database 118. The channel database service 116 then provides the channel identifiers 212 to the wireless base station 112 to be stored as part of the available channel database 122, such as in response to a query from the wireless base station 112 for available channels. The channel identifiers 212 may identify the available GA channels 208 and the available PA channels 210 in various ways, such as with reference to frequency ranges for the individual channels, channel numbers for the channels (e.g., assigned based on a regional band plan), and so forth.

In at least some embodiments, the wireless base station 112 can query the channel database service 116 for available channels periodically, such as every 24 hours, every 12 hours, every hour, and so forth. Alternatively or additionally, the wireless base station 112 can query the channel database service 116 for available channels in response to an event, such as a shortage of available channels in the available channel database 122, increased channel congestion in a geographical region, a query from the client device 102 for available channels, and so forth.

Further to the scenario 200, the client device 102 (e.g., via the client wireless module 104) queries the wireless base station 112 for available channels on a periodic basis (e.g., every 24 hours) and/or in response to various events, such as an initiation of a communication session via the communication application 110. In response to the query, the client device 102 receives channel identifiers for the available GA channels 208 and the available PA channels 210 from the available channel database 122. The client device 102 stores the channel identifiers as part of a channel set 214, which generally corresponds to channels that are available to the client device 102 for wireless communication. The client device 102 may utilize one or more channels identified in the channel set 214 to initiate and/or participate in wireless data communication.

Figure 3:
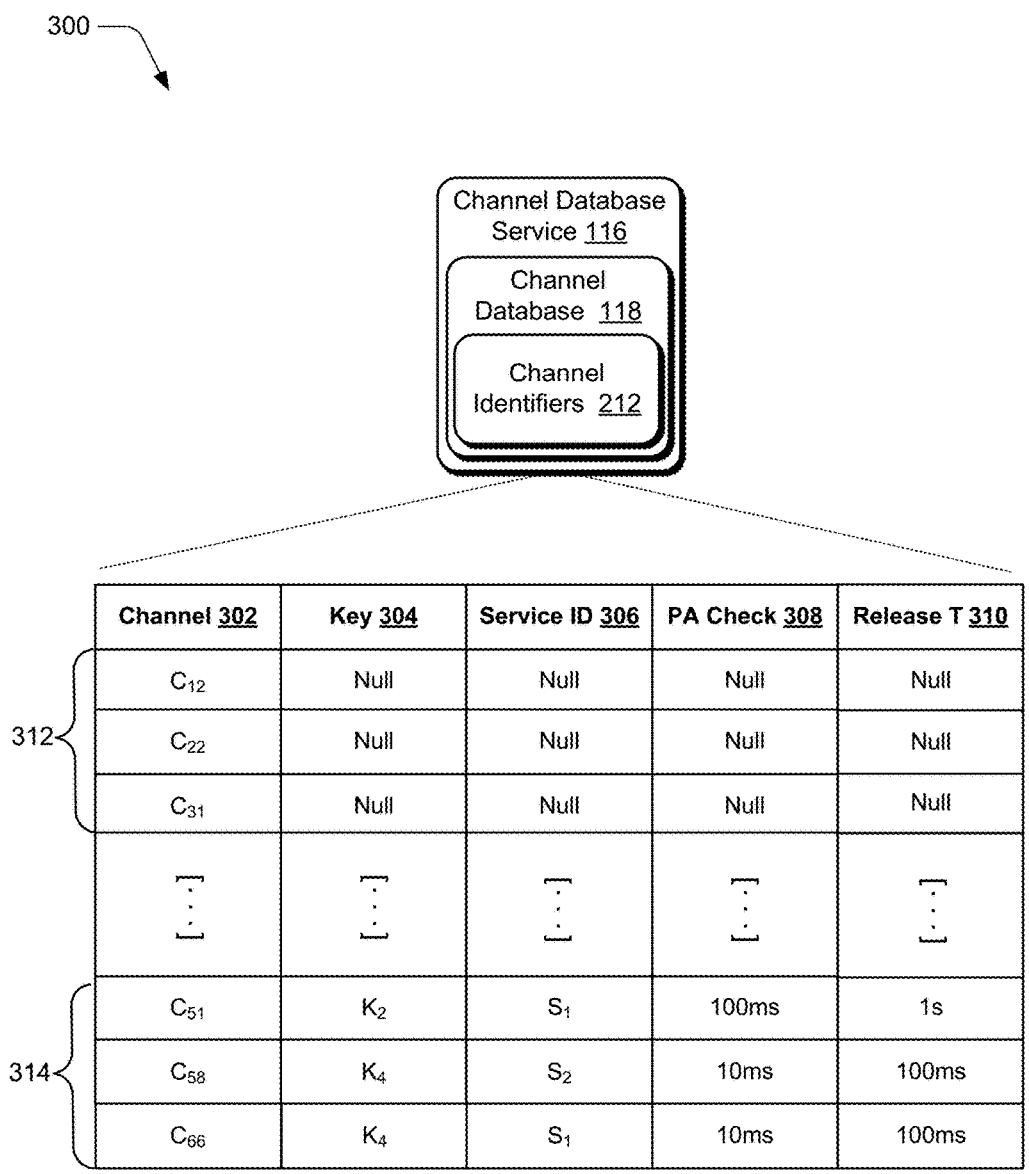
FIG. 3 illustrates an example channel table for tracking information for different wireless channels in accordance with one or more embodiments.

FIG. 3 illustrates an example channel table 300 for tracking information for different wireless channels in accordance with one or more embodiments. The channel table 300, for instance, tracks channel information for channels included in the spectrum portion 202 (introduced above), and may track channel information for other channels as well. In FIG. 3 the channel table 300 is illustrated as being maintained as part of the channel identifiers 212 of the channel database 116. The channel table 300, however, may be maintained and/or propagated to a variety of other entities as well. For instance, the channel table 300 may be provided in whole or in part to the available channel database 122 of the wireless base station 112, and/or to the channel set 214 maintained by the client device 102.

The channel table 300 includes a channel column 302, a key column 304, and a service identifier (ID) column 306. According to various embodiments, the channel column 302 tracks identifiers for different available channels. As mentioned above, channel identifiers can be specified in various ways.

The key column 304 tracks keys for the different available channels. In at least some embodiments, keys specified in the key column 304 represent public keys that are associated with respective available channels. As further detailed below, a key for a respective channel can be used to verify an identity of a PA device that is attempting to access a PA channel.

According to one or more embodiments, keys can be used to specify different priority levels for PA devices. For instance, individual keys may be associated with different priority levels to enable PA devices to be identified with particular priority levels (e.g., high, medium, low, and so on) based on which keys are linked to the PA devices.

The service ID column 306 tracks service IDs associated with different channels. In at least some embodiments, a service ID corresponds to a general ID for a particular PA service, such as "emergency medical," "fire," "law enforcement," and so forth. A service ID may alternatively or additionally identify a particular PA device, such as a media access control (MAC) address for a device, a mobile equipment ID (MEID) for a device, a phone number for a device, a subscriber identity module (SIM) ID for a device, and so forth. As yet another example, a service ID may correspond to an arbitrarily generated ID for a device and/or class of devices.

According to one or more embodiments, service IDs can be used to specify different priority levels for PA devices. For instance, different service IDs may be associated with different priority levels to enable PA devices to be identified with particular priority levels (e.g., high, medium, low, and so on) based on which service IDs are linked to the PA devices.

The channel table 300 further includes a priority access (PA) check column 308 and a release time column 310. The PA check column 308 includes time intervals for different PA channels that specify how often a GA device is to check for PA device access to a particular channel. The release time column 310 includes time intervals that specify a time limit for a GA device to release a PA channel when PA device access to the PA channel is detected. Values indicated in the release time column 310, for instance, specify a maximum time that a GA device may continue utilizing a PA channel after the GA device has detected a PA device on the PA channel.

Further to the channel table 300, consider GA channels 312, which correspond to a set of available GA channels. The channel column 302 includes identifiers for the different GA channels 312. Notice, however, that null values are specified for the GA channels 312 in the key column 304 as well as the other columns. According to various embodiments, GA channels are not associated with keys and/or other attributes of PA channels. As further detailed below, a GA channel can be reallocated as a PA channel by linking a key to the GA channel.

Consider further PA channels 314, which correspond to a set of available PA channels. The channel column 302 includes identifiers for the different PA channels 314. Further, the key column 304 includes keys for the respective PA channels 314. In at least some embodiments, a key entry for a particular PA channel may be populated with the actual key data, e.g., a string of characters that comprise a public key. Alternatively, a key entry for a particular PA channel may include a pointer and/or other identifier for a key. Thus, in at least some embodiments, the size of the channel table 300 can be reduced by utilizing pointers to keys instead of storing the actual key values in the channel table 300.

The service ID column 306 includes service IDs for the individual PA channels 314, and the PA check column 308 includes check time intervals for the individual PA channels 314. For instance, the PA channel $C_{51}$ has a check time of 100 milliseconds (ms). Thus, in a scenario where a GA device is using $C_{51}$, the GA device is instructed to check for PA device traffic on $C_{51}$ every 100 ms. In at least some embodiments, higher-priority PA channels may have shorter check times, whereas lower priority PA channels may have longer check times.

The release time column 310 includes release times for the individual PA channels 314. For instance, the PA channel $C_{51}$ has a release time of 100 ms. Thus, in a scenario where a GA device is using $C_{51}$ and detects a PA device on $C_{51}$, the GA device has 100 ms to release $C_{51}$, e.g., to terminate using $C_{51}$ for wireless data transmission. In at least some embodiments, higher-priority PA channels may have shorter release times, whereas lower priority PA channels may have longer release times. Generally, a release time provides time for a GA device to locate a replacement channel before releasing a PA channel.

Although the channel table 300 illustrates different PA channels with different PA check times, some alternative embodiments may utilize a standard check time that applies to some or all PA channels.

According to one or more embodiments, a particular PA channel may not have a specified release time, e.g., in the release time column 310. In such a scenario, a GA device may be required to release the PA channel immediately upon detection of a PA device on the channel. Alternatively, a GA device may be allowed to wait until a replacement channel is identified before releasing a PA channel to a PA device.

In at least some embodiments, the channel table 300 is configurable and reconfigurable, e.g., dynamically and by various entities. For instance, a regulatory body (e.g., the FCC) or other entity may add additional PA channels by attaching keys to existing GA channels. Further, PA channels may be reallocated as GA channels by removing their keys. Thus, a set of channels can be reallocated dynamically to accommodate various scenarios, such as a shortage of PA channels, a shortage of GA channels, and so forth.

According to one or more embodiments, the channel table 300 is region-specific, e.g., is associated with a particular geographical and/or market-based region. The channel database service 116, for instance, may maintain a variety of different channel tables that each correspond to a different geographical region. Thus, when a client device from a particular geographical region requests available channels, the channel database service can provide available channels from a channel table for that particular geographical region.

Having discussed some example implementation scenarios, consider now some example procedures in accordance with one or more embodiments.

Example Procedures

Figure 4:
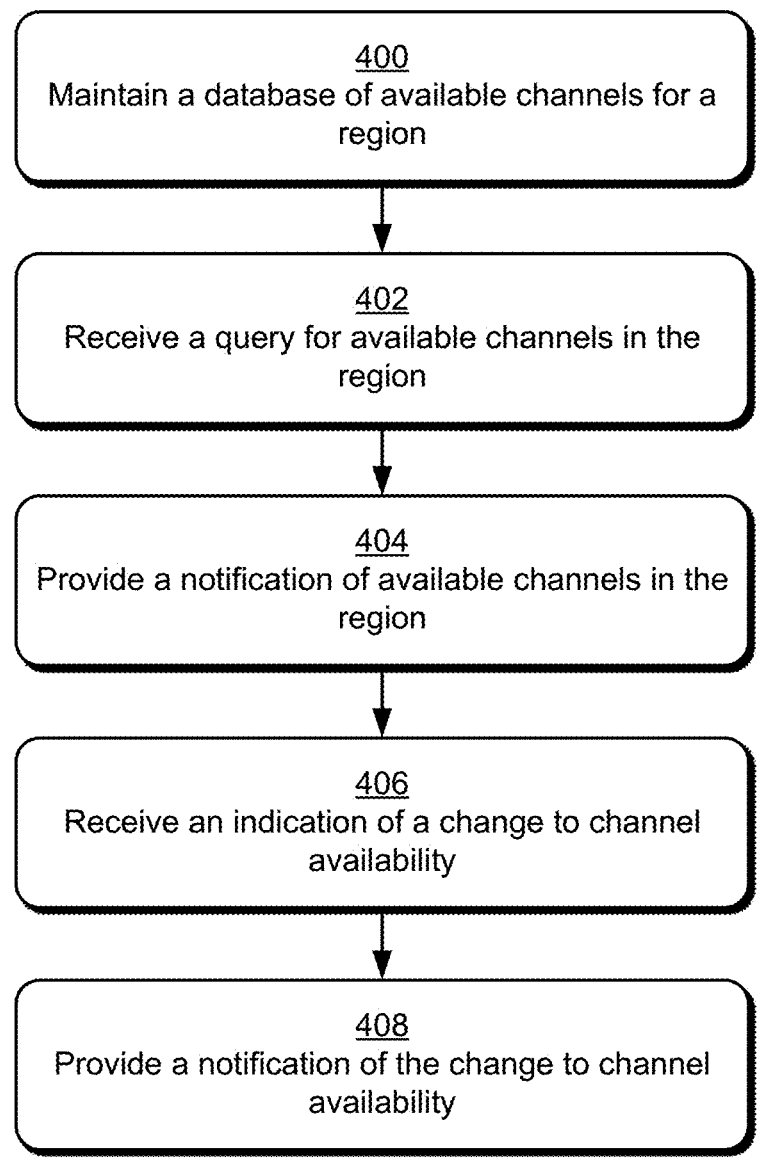
FIG. 4 is a flow diagram that describes steps in a method for maintaining a channel database in accordance with one or more embodiments.

FIG. 4 is a flow diagram that describes steps in a method for maintaining a channel database in accordance with one or more embodiments. The channel database service 116, for instance, may employ the method to maintain the channel database 118.

Step 400 maintains a database of available channels for a region. One example of such a database is the channel database 118 maintained by the channel database service 116. In at least some embodiments, the channel database 118 tracks available channels for multiple different geographical regions, such as different channel tables 300 that individually correspond to different geographical regions. Thus, available GA channels and PA channels for different geographical regions can be tracked.

Step 402 receives a query for available channels in the region. The channel database service 116, for example, receives a query from the wireless base station 112 for available channels in the region.

Step 404 provides a notification of available channels in the region. For instance, the channel database service 116 notifies the wireless base station 112 and/or the client device 102 of available channels, e.g., the available GA channels 204 and/or the available PA channel 206 introduced above. The channel database service 116 may provide various information for the available channels, such as information from the channel table 300.

Step 406 receives an indication of a change to channel availability. The channel database service 116, for instance, may determine that one or more GA channels and/or PA channels have become available. For example, a channel owner 120 may release a channel, and thus the channel database service may ascertain that the channel is now available.

Alternatively or additionally, the channel database service 116 may determine that one or more previously-available GA channels and/or PA channels are no longer available. For example, a channel owner 120 may begin using a channel, and thus the channel database service 116 may ascertain that the channel is no longer available.

Step 408 provides a notification of the change to channel availability. For instance, the channel database service 116 notifies the wireless base station 112 and/or the client device 102 of the change. The channel database service 116, for example, may update the channel table 300 to add newly-available channels and/or to delete channels that are no longer available. Updates to the channel table 300 can be provided to (e.g., pushed to and/or pulled from) the wireless base station 112. The wireless base station 112 may update the available channel database 122 based on the notification, and may further provide such updates to the client device 102.

Figure 5:
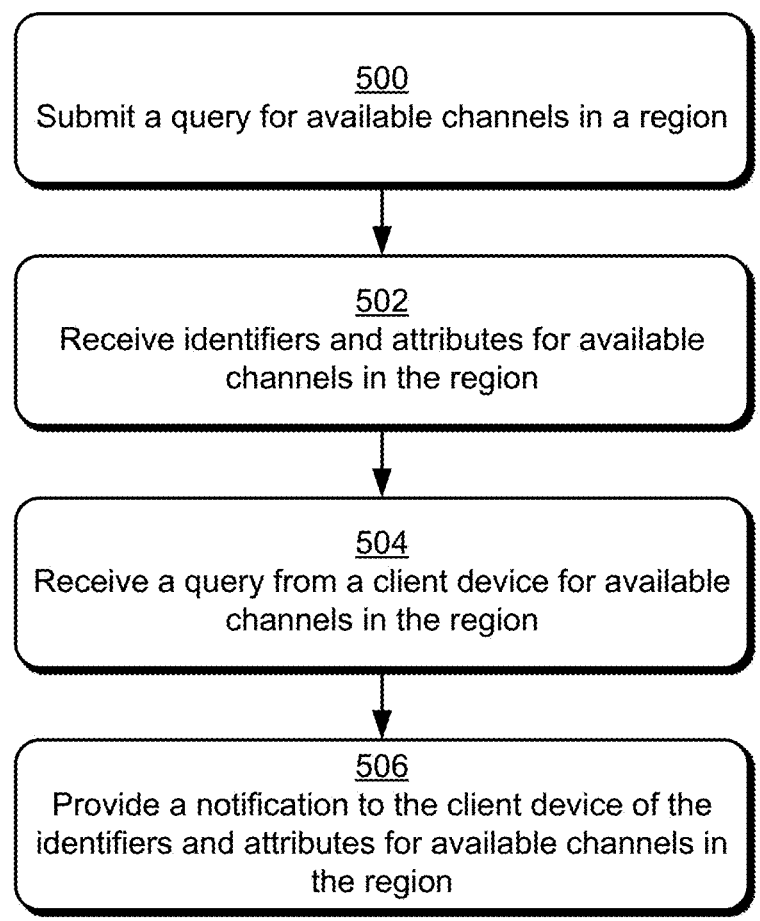
FIG. 5 is a flow diagram that describes steps in a method for determining available channels in a region in accordance with one or more embodiments.

FIG. 5 is a flow diagram that describes steps in a method for determining available channels in a region in accordance with one or more embodiments.

Step 500 submits a query for available channels in a region. The wireless base station 112, for instance, queries the channel database service 116 for available wireless channels in a particular geographical region and/or set of geographical regions.

Step 502 receives identifiers and attributes for available channels in the region. For example, the wireless base station 112 receives information from a channel table (e.g., the channel table 300) from the channel database service 116. According to one or more embodiments, a portion of the channel table may be received, or a copy of the entire channel table. The identifiers and attributes may correspond to available GA channels and available PA channels. The wireless base station 112, for instance, stores the identifiers and attributes for the available channels as part of the available channel database 122.

Step 504 receives a query from a client device for available channels in the region. The wireless base station 112, for example, receives a query from the client device 102 for available channels. In at least some embodiments, the query includes geographical position information for the client device, such as Global Positioning System (GPS) coordinates, a street address, a city or town name, and/or any other suitable way of describing a location of the client device.

Step 506 provides a notification to the client device of the identifiers and attributes for available channels in the region. For instance, the wireless base station 112 provides various information regarding available channels from the available channel database 122 to the client device 102. In at least some embodiments, the information includes some or all of a channel table that tracks the available channels in the region, and includes information for available GA channels and available PA channels.

According to one or more embodiments, if a change to available channels is received (e.g., as discussed above), the change can be provided (e.g., pushed) to the client device. For instance, the wireless base station 112 may receive an update to available channels from the channel database service 116, and may push the update to the client device 102. In at least some embodiments, the update may be pushed independent of a query from the client device.

Figure 6:
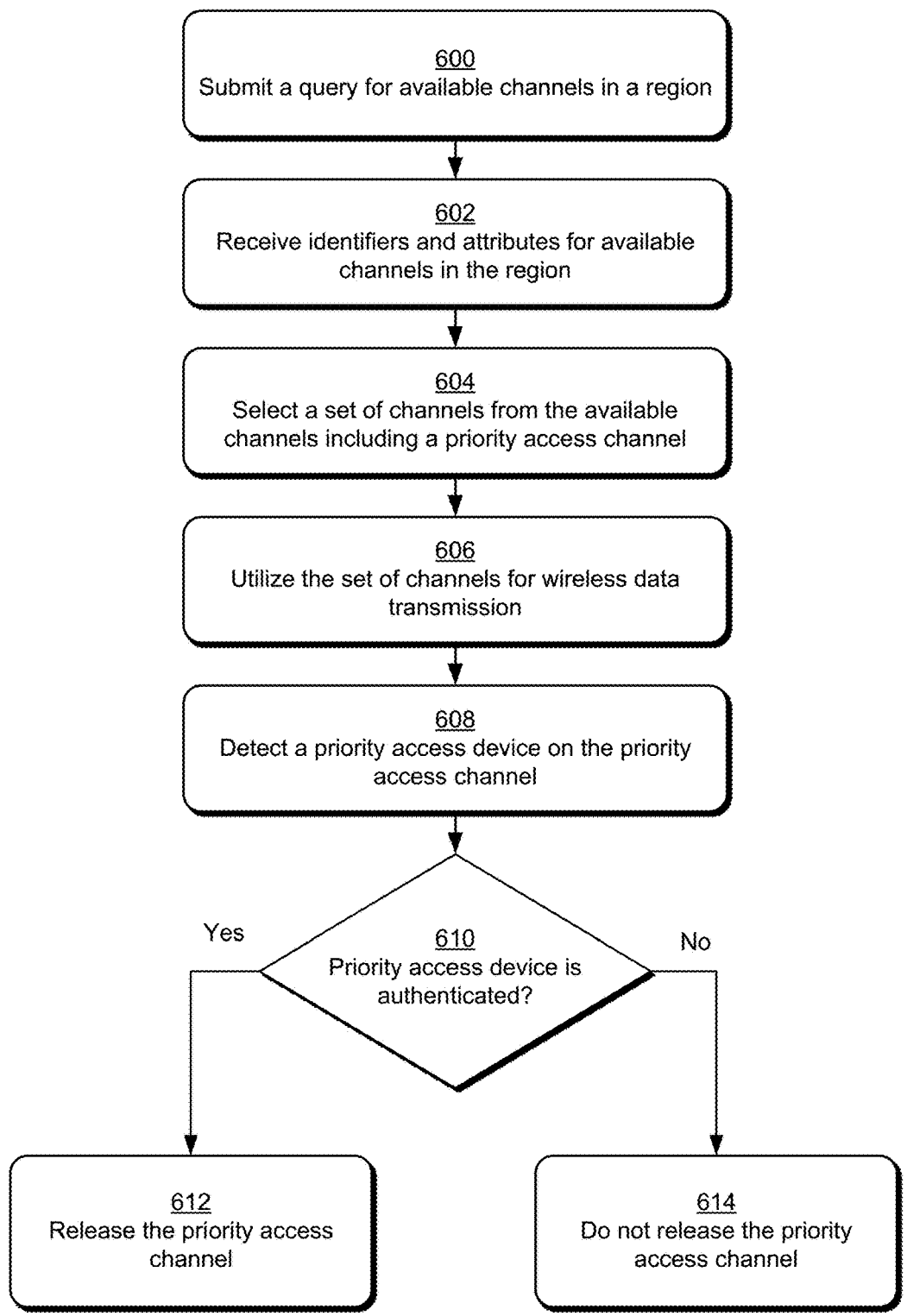
FIG. 6 is a flow diagram that describes steps in a method for determining by a client device available channels in a region in accordance with one or more embodiments.

FIG. 6 is a flow diagram that describes steps in a method for determining by a client device available channels in a region in accordance with one or more embodiments.

Step 600 submits a query for available channels in a region. The client device 102, for instance, queries the wireless base station 112 for available wireless channels in a particular geographical region and/or set of geographical regions. In at least some embodiments, the query include geographical position information for the client device 102, examples of which are discussed above.

Step 602 receives identifiers and attributes for available channels in the region. For example, the client device 102 receives information from a channel table (e.g., the channel table 300) from the wireless base station 112. According to one or more embodiments, a portion of the channel table may be received, or a copy of the entire channel table. The identifiers and attributes may correspond to available GA channels and available PA channels. The client device 102, for instance, stores the identifiers and attributes for the available channels as part of the channel set 214.

According to one or more embodiments, the client device 102 receives keys (e.g., public keys) for available PA channels, such as keys specified in the key column 304 of the channel table 300. The client device 102 may cache the keys locally such that the client device 102 need not download a key for a particular PA channel every time the client device 102 receives an indication that the PA channel is available.

In at least some embodiments, the association of a key with a channel indicates that the channel is a PA channel. If a channel has no associated key, this indicates that the channel is a GA channel. Thus, a device (e.g., the client device) can differentiate PA channels from GA channels based on which channels have associated keys and which do not.

Step 604 selects a set of channels from the available channels including a priority access (PA) channel. For example, the client device 102 selects one or more channels for wireless data transmission. The one or more channels may be selected based on various criteria, such as channel quality, channel congestion, channel proximity to other available channels, and so forth. Alternatively or additionally, the set of channels may be selected based on use-specific parameters, such as parameters specified by the communication application 110 for communication sessions.

Step 606 utilizes the set of channels for wireless data transmission. The client device 102, for instance, initiates and/or participates in wireless data transmission via the set of available channels, including the priority access channel. In at least some embodiments, the set of channels may include both a GA channel and a PA channel, or may include only a PA channel and/or PA channels.

Step 608 detects a priority access (PA) device on the PA channel. For example, the client device 102 detects that a PA device 124 is accessing or attempting to access the PA channel. The PA device can be detected in various ways, such as via a PA device identifier and/or designator transmitted by the PA device.

In at least some embodiments, the PA device is detected based on a check that is performed periodically, e.g., according to a PA check time specified for the PA channel. Examples of PA check times are discussed above with reference to channel table 300.

Step 610 ascertains whether the priority access device is authenticated. The client device 102, for instance, verifies whether the PA device is authenticated as a PA device that is entitled to priority access to the PA channel. An example way of authenticating a PA device is described below.

If the priority access device is authenticated ("Yes"), step 612 releases the priority access channel. For instance, the client device 102 stops transmitting data over the PA channel. An example way of releasing a PA channel is described below. The authenticated PA device may then utilize the PA channel without interruption from the GA device.

If the priority access device is not authenticated ("No"), step 614 does not release the priority access channel. If the PA device fails authentication, for example, the client device may continue transmitting data over the PA channel. In at least some embodiments, a PA device's failure to be authenticated may indicate that a device is attempting to spoof a PA device, e.g., a GA device is attempting to imitate a PA device to gain priority access to a PA channel.

Figure 7:
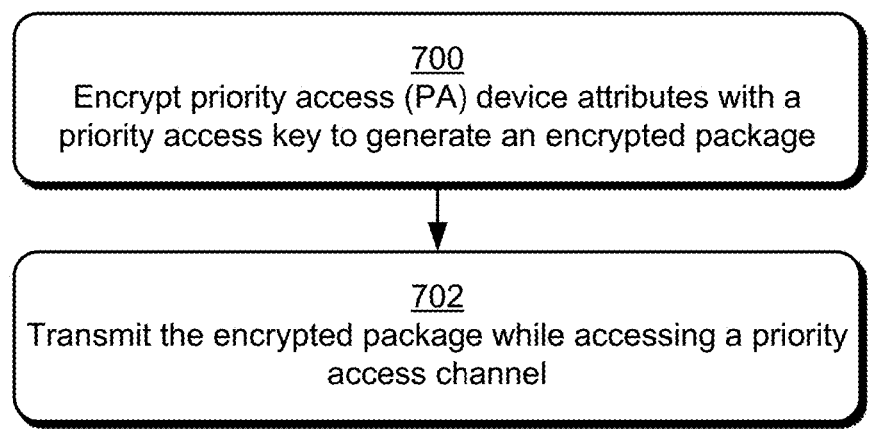
FIG. 7 is a flow diagram that describes steps in a method for PA device access to a PA channel in accordance with one or more embodiments.

FIG. 7 is a flow diagram that describes steps in a method for PA device access to a PA channel in accordance with one or more embodiments.

Step 700 encrypts priority access (PA) device attributes with a priority access key to generate an encrypted package. The PA device 124, for instance, encrypts various information with its respective private key 126. Examples of such information include a device identifier, examples of which are discussed above. Other examples of such information include a service ID associated with the PA device, such as a service ID specified in the service ID column 306 of the channel table 300. A variety of other types of information may additionally or alternatively be encrypted via a priority access key to generate an encrypted package. Generally, an encrypted package represents an encrypted set of information that can be utilized in various ways, such as for authenticating a PA device.

As referenced above, in at least some embodiments a priority access key may represent a private key that is maintained by the PA devices 124 to encrypt data in various scenarios.

Step 702 transmits the encrypted package while accessing a priority access channel. The PA device 124, for instance, can transmit the encrypted package as part of a request for access to a PA channel. Alternatively or additionally, the PA device 124 can transmit the encrypted package while transmitting data over a PA channel, e.g., during an established communication session between the PA device and another device.

According to one or more embodiments, a PA device can transmit the encrypted package in various ways. For instance, the encrypted package can be transmitted in a packet header of communication data that is transmitted over a PA channel. Other example ways of transmitting an encrypted package include as part of an information element transmitted by a PA device, within a control channel (e.g., in a duplex gap), as part of an identification beacon transmitted by a PA device, and so forth.

In at least some embodiments, an encrypted package is utilized to authenticate a PA device. For instance, consider the following example procedure.

Figure 8:
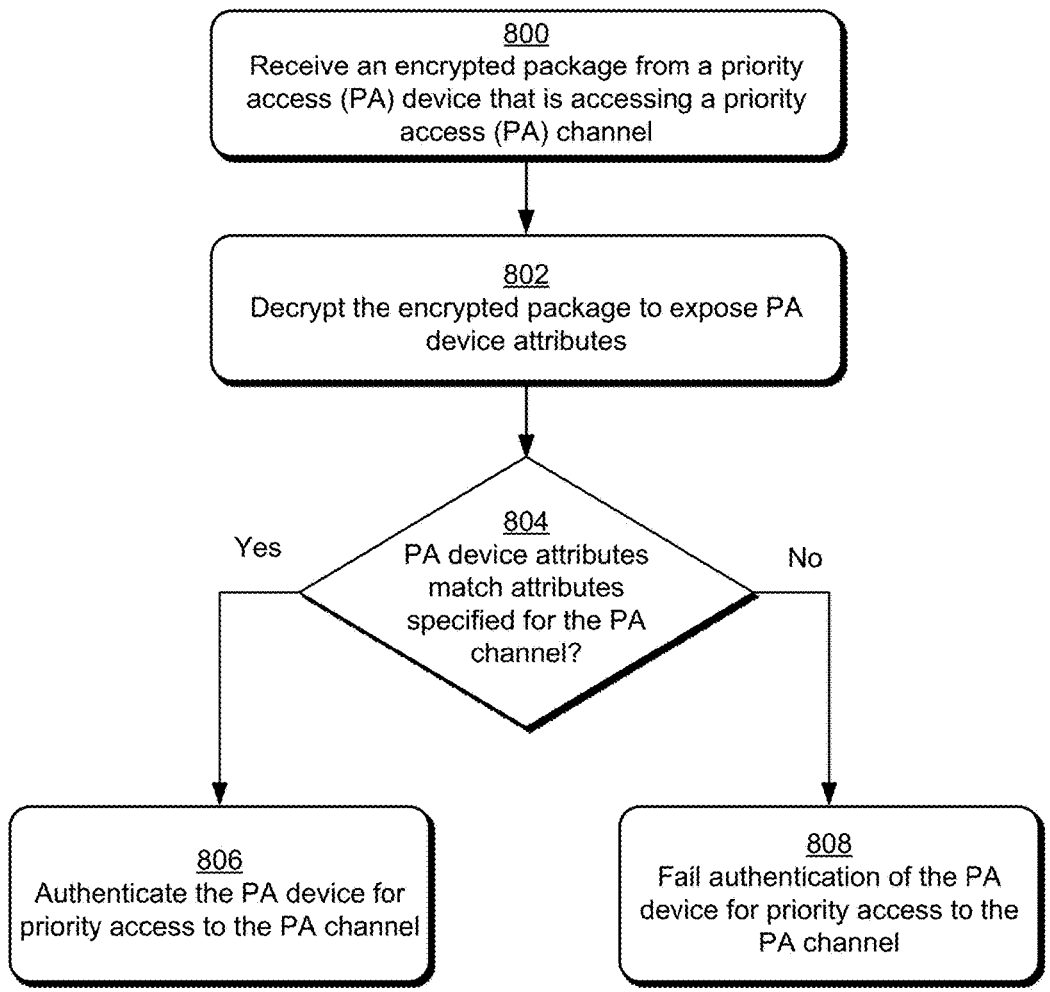
FIG. 8 is a flow diagram that describes steps in a method for authenticating a priority access device in accordance with one or more embodiments.

FIG. 8 is a flow diagram that describes steps in a method for authenticating a PA device in accordance with one or more embodiments.

Step 800 receives an encrypted package from a priority access (PA) device that is accessing a priority access (PA) channel. The client device 102, for instance, receives an encrypted package from the PA device 124 as part of a request from the PA device 124 to access a PA channel, and/or while the PA device 124 is transmitting data over the PA channel.

Step 802 decrypts the encrypted package to expose PA device attributes. The client device 102, for instance, uses a decryption key (e.g., a public key) specified for the PA channel. With reference to the channel table 300, for example, a key from the key column 304 that corresponds to the PA channel is retrieved and used to decrypt the encrypted package.

Step 804 ascertains whether the PA device attributes match attributes specified for the PA channel. Examples of such attributes include attributes specified for the PA channel in service ID column 306 of the channel table 300. See the discussion of the channel table 300, above, for specific examples of such attributes.

If the PA device attributes match attributes specified for the PA channel ("Yes"), step 806 authenticates the PA device for priority access to the PA channel. For instance, if the client device 102 authenticates the PA device 124, the client device 102 may release the PA channel, e.g., may stop transmitting over the PA channel.

If the PA device attributes do not match attributes specified for the PA channel ("No"), step 808 fails authentication of the PA device for priority access to the PA channel.

Figure 9:
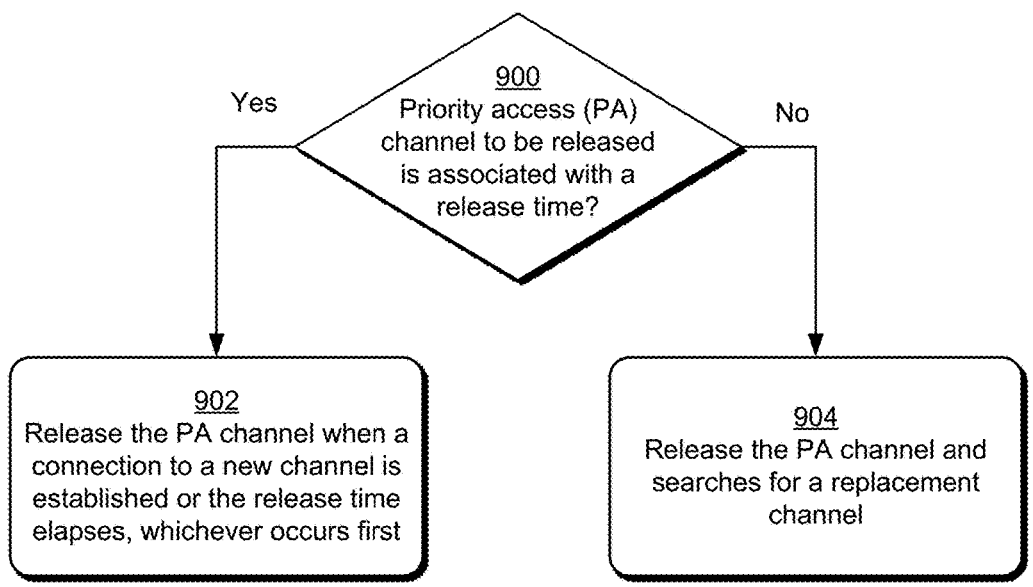
FIG. 9 is a flow diagram that describes steps in a method for releasing a priority access channel in accordance with one or more embodiments.

FIG. 9 is a flow diagram that describes steps in a method for releasing a PA channel in accordance with one or more embodiments.

Step 900 ascertains whether a priority access (PA) channel to be released is associated with a release time. Examples of PA channel release times are discussed above with reference to the channel table 300. In at least some embodiments, different PA channels may be associated with different release times. Alternatively, a group of different PA channels may be generally associated with the same release time.

If the PA channel is associated with a release time ("Yes"), step 902 releases the PA channel when a connection to a new channel is established or the release time elapses, whichever occurs first. For instance, a release time counter may begin elapsing when a PA device is detected on a PA channel. While the counter is elapsing, a GA device (e.g., the client device 102) may search for a replacement channel, e.g., an available PA channel and/or an available GA channel. If a replacement channel is located before the counter elapses, the GA device may switch to the replacement channel and release the PA channel. If the counter elapses before a replacement channel is identified, the PA channel will be released and the GA device may continue looking for a replacement channel.

In an alternative embodiment, a PA channel may be associated with a conditional release, e.g., that is conditioned upon GA device currently using the PA channel finding a replacement channel. In such embodiments, a GA device may look for a replacement channel while continuing to use the PA channel, and may continue to use the PA channel until a replacement channel is located.

If the PA channel is not associated with a release time ("No"), step 904 releases the PA channel and searches for a replacement channel. A GA device, for instance, will release the channel immediately upon detection of a PA device on the PA channel. The GA device may look for a replacement channel after releasing the PA channel.

At least some embodiments may employ channel aggregation (e.g., carrier aggregation) such that multiple channels are used together for data transmission. Such embodiments are particularly useful for transmission scenarios that require high bandwidth, such as for multimedia communication sessions. When channel aggregation is employed, multiple PA channels may be utilized, and/or a combination of GA channels and PA channels.

When a GA device is employing channel aggregation that utilizes a PA channel and a PA device is detected on the PA channel, instead of releasing the PA channel, the GA device may simply reduce transmission power over the PA channel (and optionally, other channels as well) to reduce interference with data transmission from the PA device. Thus, embodiments may enable a GA device to continue using a PA channel in channel aggregation scenarios, even when PA device traffic is detected on the PA channel.

Having discussed some example procedures, consider now a discussion of an example system and device in accordance with one or more embodiments.

Example System and Device

Figure 10:
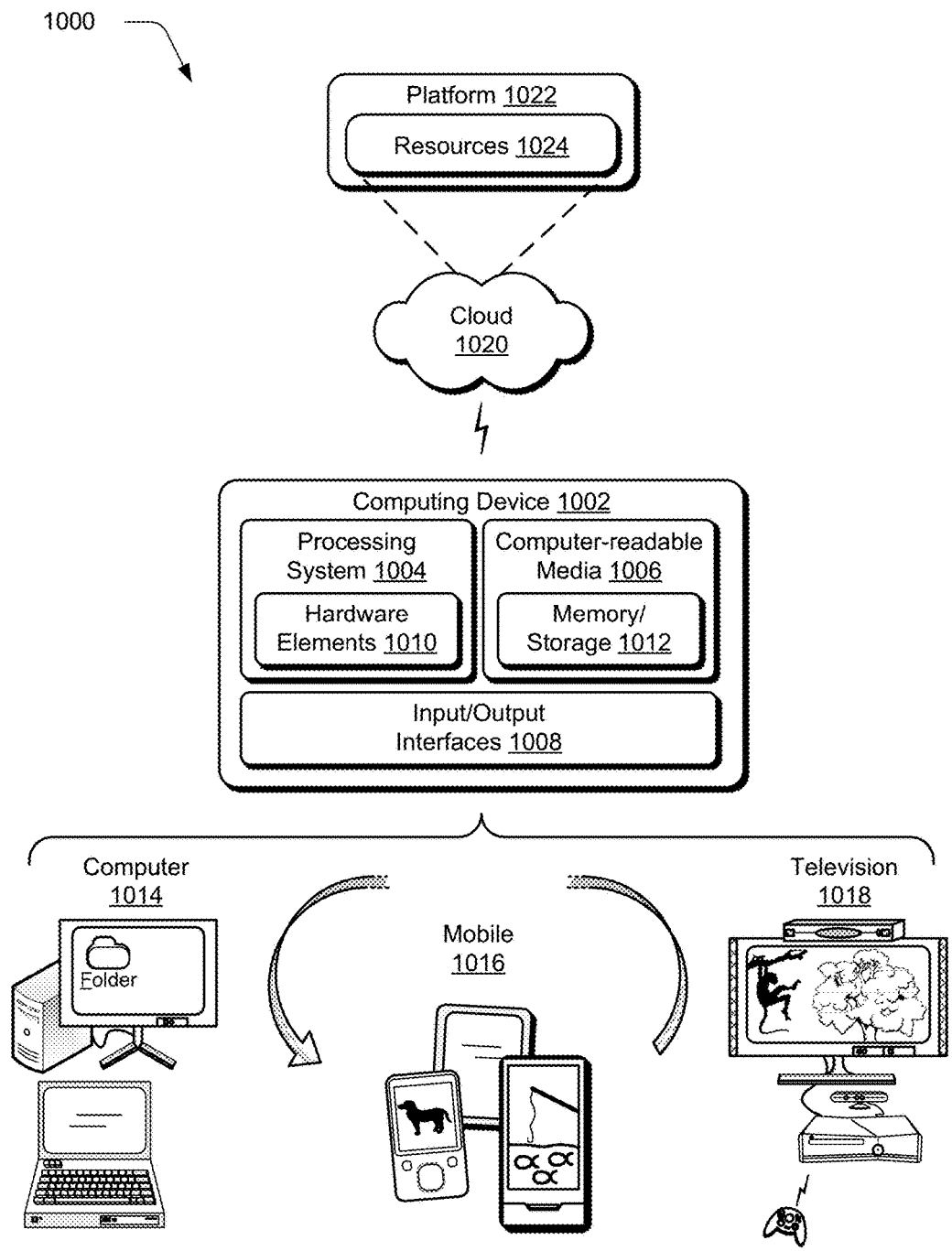
FIG. 10 illustrates an example system and computing device as described with reference to FIG. 1, which are configured to implement embodiments of techniques described herein.

FIG. 10 illustrates an example system generally at 1000 that includes an example computing device 1002 that is representative of one or more computing systems and/or devices that may implement various techniques described herein. For example, the client device 102 discussed above with reference to FIG. 1 can be embodied as the computing device 1002. The computing device 1002 may be, for example, a server of a service provider, a device associated with the client (e.g., a client device), an on-chip system, and/or any other suitable computing device or computing system.

The example computing device 1002 as illustrated includes a processing system 1004, one or more computer-readable media 1006, and one or more I/O Interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone (e.g., for implementing voice and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of modules discussed herein as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1014, mobile 1016, and television 1018 uses. Each of these configurations includes devices that may have generally different constructs and capabilities, and thus the computing device 1002 may be configured according to one or more of the different device classes. For instance, the computing device 1002 may be implemented as the computer 1014 class of a device that includes a personal computer, desktop computer, a multi-screen computer, laptop computer, netbook, and so on.

The computing device 1002 may also be implemented as the mobile 1016 class of device that includes mobile devices, such as a mobile phone, portable music player, portable gaming device, a tablet computer, a multi-screen computer, and so on. The computing device 1002 may also be implemented as the television 1018 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. For example, functionalities discussed with reference to the client device 102, the wireless base station 112, and/or the channel database service 116 may be implemented all or in part through use of a distributed system, such as over a "cloud" 1020 via a platform 1022 as described below.

The cloud 1020 includes and/or is representative of a platform 1022 for resources 1024. The platform 1022 abstracts underlying functionality of hardware (e.g., servers) and software resources of the cloud 1020. The resources 1024 may include applications and/or data that can be utilized while computer processing is executed on servers that are remote from the computing device 1002. Resources 1024 can also include services provided over the Internet and/or through a subscriber network, such as a cellular or Wi-Fi™ network.

The platform 1022 may abstract resources and functions to connect the computing device 1002 with other computing devices. The platform 1022 may also serve to abstract scaling of resources to provide a corresponding level of scale to encountered demand for the resources 1024 that are implemented via the platform 1022. Accordingly, in an interconnected device embodiment, implementation of functionality described herein may be distributed throughout the system 1000. For example, the functionality may be implemented in part on the computing device 1002 as well as via the platform 1022 that abstracts the functionality of the cloud 1020.

Discussed herein are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for priority access to a priority access channel are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
one or more processors; and
one or more computer-readable storage media having instructions stored thereon that, responsive to execution by the one or more processors, cause the one or more processors to perform operations including:
receiving, from a channel database service, a portion of an available channel database, the portion of the available channel database including entries for priority access channels and general access channels in a region covered by the system, wherein the entries for the priority access channels include different keys for different priority access channels, wherein each of the keys corresponds to a respective priority level for a respective priority access device of a plurality of priority access devices;
receiving a query, from one general access device of a plurality of general access devices served by the system, the received query being for available wireless channels in the region;
providing a notification of available wireless channels in the region to the general access device, the notification including an identifier for at least one of the priority access channels and a respective key that is usable to authenticate a priority access device of the plurality of priority access devices for priority access to the priority access channel;
receiving an indication of a change of channel availability in the region; and
providing a notification of the change in channel availability to at least one general access device of the plurality of general access devices and to the channel database service.

2. A system as recited in claim 1, wherein the query includes geographical position information for the region.

3. A system as recited in claim 1, wherein the system comprises a wireless base station in the region.

4. A system as recited in claim 1, wherein the notification of available wireless channels includes a priority access check time for the priority access channel that specifies how frequently the general access device that is utilizing the priority access channel is to check for priority access device access to the priority access channel.

5. A system as recited in claim 1, wherein the notification of available wireless channels includes a release time for the priority access channel that specifies a maximum time that the general access device may continue utilizing the priority access channel after the general access device has detected the priority access device on the priority access channel.

6. A system as recited in claim 1, wherein at least some of the keys in the available channel database correspond to different priority levels for the respective priority access devices.

7. A system as recited in claim 1, wherein the operations further comprise:
receiving an indication of a further change of channel availability in the region; and
providing a notification of the further change in channel availability to the at least one general access device of the plurality of general access devices.

8. A method comprising:
receiving, from a channel database service, a portion of an available channel database, the portion of the available channel database including entries for priority access channels and general access channels in a region covered by a system, wherein the entries for the priority access channels include different keys for different priority access channels, wherein each of the keys corresponds to a respective priority level for a respective priority access device of a plurality of priority access devices;

receiving a query for available wireless channels in the region; and providing, by a processing system, a notification of available wireless channels in the region including an identifier for at least one of the priority access channels and a respective key that is usable to authenticate a priority access device of the plurality of priority access devices for priority access to the priority access channel;

receiving an indication of a change of channel availability in the region; and providing a notification of the change in channel availability to at least one general access device of a plurality of general access devices and to the channel database service.

9. A method as recited in claim 8, wherein the query includes geographical position information for the region.

10. A method as recited in claim 8, wherein the query is from a general access client device of the plurality of general access devices.

11. A method as recited in claim 8, wherein the notification of available wireless channels includes a priority access check time for the priority access channel that specifies how frequently a general access device of the plurality of general access devices that is utilizing the priority access channel is to check for priority access device access to the priority access channel.

12. A method as recited in claim 8, wherein the notification of available wireless channels includes a release time for the priority access channel that specifies a maximum time that a general access device of the plurality of general access devices may continue utilizing the priority access channel after the general access device has detected the priority access device on the priority access channel.

13. A method as recited in claim 8, wherein at least some of the keys in the available channel database correspond to different priority levels for the respective priority access devices.

14. A method as recited in claim 8, further comprising:
receiving an indication of a further change of channel availability in the region, and
providing a notification of the further change in channel availability to the at least one general access device of the plurality of general access devices.

15. A method comprising:
receiving, from a channel database service, a portion of an available channel database, the portion of the available channel database including entries for priority access channels and general access channels in a region covered by a system, wherein the entries for the priority access channels include different keys for different priority access channels, wherein each of the keys corresponds to a respective priority level for a respective priority access device of a plurality of priority access devices;

receiving, from a general access client device, a query for available wireless channels in the region; and providing, by a processing system, a notification to the general access client device of available wireless channels in the region including an identifier for at least one of the priority access channels and at least one key of the different keys for the at least one priority access channel, wherein the at least one key is usable by the general access client device to authenticate the respective priority access device for priority access to the priority access channel;

receiving an indication of a change of channel availability in the region; and providing a notification of the change in channel availability to the general access client device and to the channel database service.

16. A method as recited in claim 15, wherein the notification of available wireless channels includes a priority access check time for the priority access channel that specifies how frequently the general access client device that is utilizing the priority access channel is to check for priority access device access to the priority access channel.

17. A method as recited in claim 15, wherein the notification of available wireless channels includes a release time for the priority access channel that specifies a maximum time that the general access client device may continue utilizing the priority access channel after the general access client device has detected the priority access device on the priority access channel.

18. A method as recited in claim 15, further comprising:
receiving a further indication of a further change of channel availability in the region, the indication indicating one or more of that a new channel is available in the region, or that a previously-available channel is no longer available; and
providing a notification of the further change in channel availability to the general access client device.

* * * * *